(12) United States Patent
Ogasawara et al.

(10) Patent No.: US 8,950,713 B2
(45) Date of Patent: Feb. 10, 2015

(54) CLIP

(71) Applicants: Daiwa Kasei Industry Co., Ltd., Aichi (JP); Toyota Jidosha Kabushiki Kaisha, Aichi (JP)

(72) Inventors: Noriyuki Ogasawara, Aichi (JP); Mitsutoshi Yamamoto, Aichi (JP); Akio Goto, Aichi (JP); Akihito Tsukamoto, Aichi (JP)

(73) Assignees: Daiwa Kasei Industry Co., Ltd., Aichi (JP); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 14/302,850

(22) Filed: Jun. 12, 2014

(65) Prior Publication Data

US 2014/0367539 A1 Dec. 18, 2014

(30) Foreign Application Priority Data

Jun. 14, 2013 (JP) ................................. 2013-125454

(51) Int. Cl.
| | | |
|---|---|---|
| *F16L 3/08* | (2006.01) | |
| *F16L 3/12* | (2006.01) | |
| *B60R 11/00* | (2006.01) | |
| *F16L 3/137* | (2006.01) | |

(52) U.S. Cl.
CPC .......... *B60R 11/00* (2013.01); *B60R 2011/0059* (2013.01); *B60R 2011/0071* (2013.01); *F16L 3/137* (2013.01)
USPC .......... 248/74.3; 248/71; 248/74.1; 24/16 PB

(58) Field of Classification Search
CPC ............ B60R 11/00; B60R 2011/0059; B60R 2011/0071; F16L 3/137
USPC .......................... 248/74.1, 74.3, 71; 24/16 PB
See application file for complete search history.

(56) References Cited

U.S. PATENT DOCUMENTS

| 6,659,701 | B1 | 12/2003 | Risdale | |
|---|---|---|---|---|
| 2007/0284486 | A1* | 12/2007 | Smutny et al. | ............... 248/74.3 |

FOREIGN PATENT DOCUMENTS

| JP | 08-159118 | 6/1996 |
|---|---|---|
| JP | 2001-317515 | 11/2001 |
| JP | 2007288994 | 11/2007 |
| JP | 2012-193830 | 10/2012 |

OTHER PUBLICATIONS

English translation of the Abstract for JP 2012-193830 published on Oct. 11, 2012.
English translation of the Abstract for JP 2001-317515 published on Nov. 16, 2001.
English translation of the Abstract for JP 08-159118 published on Jun. 18, 1996.
English translation of the Abstract for JP 08-159118 Correction published on Jun. 18, 1996.
English translation of the Abstract for JP 2007-288994 filed Nov. 1, 2007.

* cited by examiner

*Primary Examiner* — Amy Sterling
(74) *Attorney, Agent, or Firm* — Thomas | Horstemeyer, LLP

(57) ABSTRACT

A clip is provided which allows the lengths of paired leg portions extendable and contractible in the same manner as a pantograph to be shorter in a state where the clip is mounted on a silencer, than in the conventional art. Third hinge portions which connect the second leg portions of the opposed leg portions to the common connection leg portion at a side opposite to first hinge portions which connect the insertion base portion to the first leg portions are formed at an inner side so as to be closer to an insertion axis for a hole of the silencer than the first hinge portions, whereby a folded state is obtained with such a small angle that each first leg portion and each second leg portion are in contact with or close to each other.

2 Claims, 13 Drawing Sheets

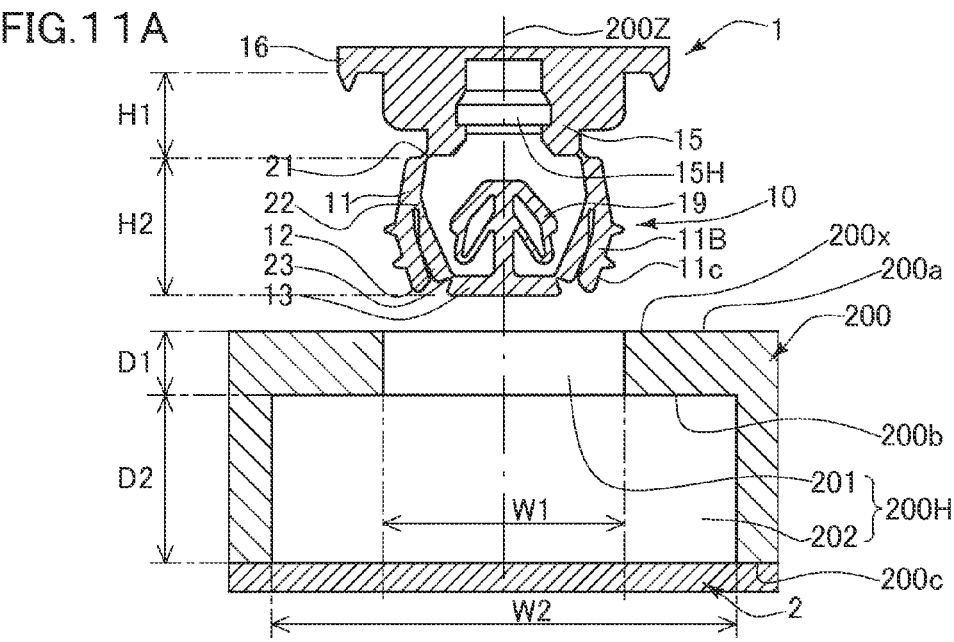
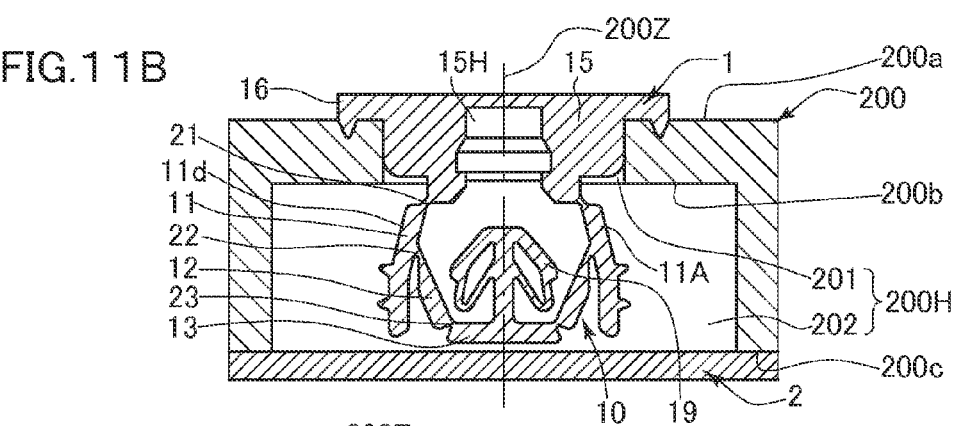
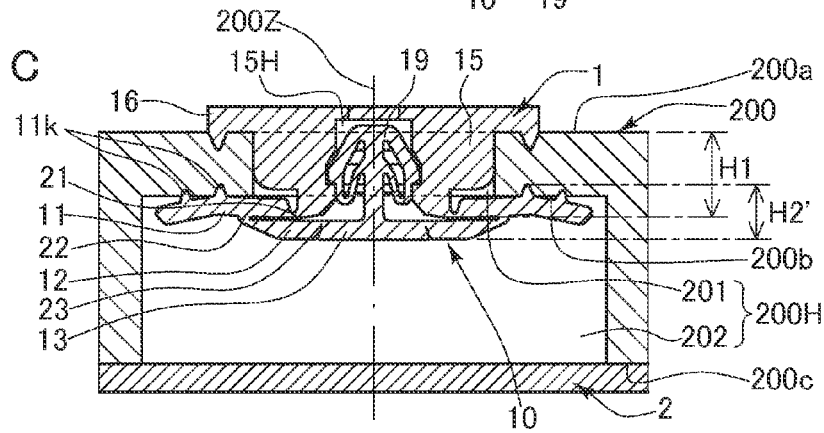

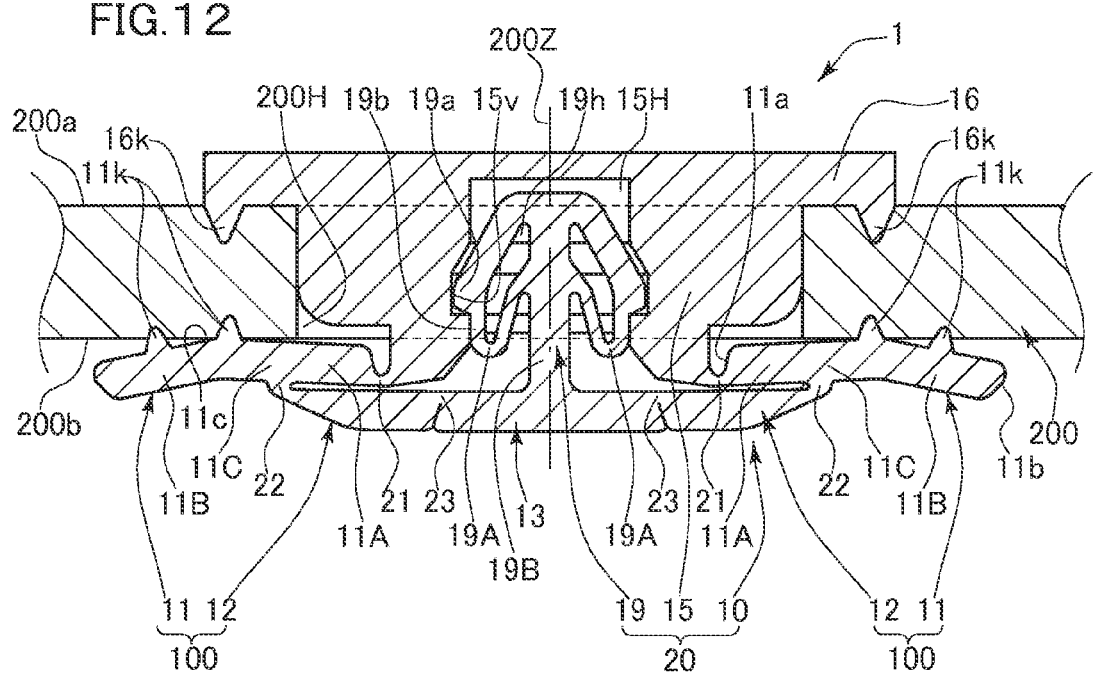

CLIP

RELATED APPLICATIONS

This application claims the priority of Japanese Patent Application No. 2013-125454 filed on Jun. 14, 2013. The disclosure of the prior application is hereby incorporated herein in the entirety by reference.

BACKGROUND OF THE INVENTION

1. Field of the Invention

The invention relates to a clip that is mounted in a hole of an elastically-deformable soft material disposed on a base member and is capable of holding a mounted object at the front surface side of the soft material in this mounted state.

2. Description of Related Art

In a vehicle (e.g., an automobile, etc.), a silencer (sound absorbing material) composed of a soft material such as felt, urethane foam, or the like is mounted on an inner portion of an instrument panel or a floor, thereby insulating sound such that noise in an engine compartment or from outside of the vehicle does not reach the interior of the vehicle.

In the case where a wire harness is laid on the silencer, a dedicated clip is used. A conventional clip (e.g., a clip disclosed in Japanese Laid-Open Patent Publication No. 2012-193830) is fixed by using a stud bolt mounted on a base member which supports the silencer or by using a through hole provided in the base member. However, since the stud bolt has to be mounted on the base member or the through hole has to be provided in the base member, time and effort are required for fixing the clip.

On the other hand, the clip in Japanese Laid-Open Patent Publication No. 2012-193830 can be mounted directly on a silencer by inserting the clip into a hole of the silencer such that paired leg portions thereof are initially inserted until a contact portion thereof at a side opposite to the leg portions comes into contact with a portion, surrounding the hole, of the silencer; bending and deforming the paired leg portions in the same manner as a pantograph such that intermediate portions of the leg portions spread outward; and sandwiching the portion, surrounding the hole, of the silencer between the outwardly spreading leg portions and the contact portion. Thus, in the case of using the clip, it is only necessary to provide a mounting hole in a silencer, and it is unnecessary to provide a mounting hole in a base member or provide a stud bolt to a base member.

SUMMARY OF THE INVENTION

In the clip in Japanese Laid-Open Patent Publication No. 2012-193830, the paired opposed leg portions are extendable and contractible in the same manner as a pantograph. In mounting the clip on the silencer, these leg portions are bent and contracted such that the intermediate portions thereof spread outward. However, in the bent state, each leg portion has a dog-legged shape with a large bending angle, and thus, the clip has a structure that needs a certain length in an extending/contracting direction. In recent years, size reduction is desired also for such a type of clip. However, in the case of the clip, the necessity to have a certain length in the extending/contracting direction hinders size reduction.

An object of the invention is to provide a clip that allows the lengths of paired leg portions extendable and contractible in the same manner as a pantograph to be shorter in a state where the clip is mounted on a silencer, than in the conventional art.

In order to attain the above-described object, a clip according to the invention includes: a holding portion capable of holding a mounted object; an insertion portion inserted into a hole of a silencer; and a contact portion brought into contact with a front surface of a portion, surrounding the hole, of the silencer at a near side in an insertion direction in which the insertion portion is inserted. The clip is mounted on the silencer such that the insertion portion is inserted into the hole. The insertion portion includes an insertion base portion which is located within the hole at the near side in the insertion direction in a state where the clip is mounted on the silencer; an extension/contraction portion which is located at a far side, in the insertion direction, of the hole in the state where the clip is mounted on the silencer and is deformable so as to extend and contract in the insertion direction in the same manner as a pantograph; and an engagement portion which gets close to and comes into engagement with the insertion base portion when the extension/contraction portion is contracted. The extension/contraction portion includes a pair of opposed leg portions which extend in the insertion direction at both sides of an insertion axis for the hole and are opposed to each other, and each of the opposed leg portions includes a first leg portion which is connected to the insertion base portion via a first hinge portion; and a second leg portion which is connected to the first leg portion via a second hinge portion. The extension/contraction portion further includes a connection leg portion which is connected to one of the second leg portions of the paired opposed leg portions via a third hinge portion at one end side thereof and is connected to the other second leg portion via a third hinge portion at another end side thereof. By displacing the connection leg portion in a direction opposite to the insertion direction, the opposed leg portions are contracted by bending such that the second hinge portions are displaced outward in a direction perpendicular to the insertion axis, to obtain a mounted state where the engagement portion formed at the connection leg portion has got close to and has come into engagement with the insertion base portion. Each third hinge portion is formed at an inner side so as to be closer to the insertion axis than the first hinge portion, and a folded state where the first leg portion and the second leg portion are in contact with or close to each other is obtained in the mounted state. In the first leg portion, the first hinge portion is formed at one end side in an extending direction in which the first leg portion extends, the second hinge portion is formed at an intermediate portion in the extending direction, and another end side in the extending direction is formed as a stopper contact portion which moves around to and comes into contact with a back surface of the silencer.

According to the above-described configuration of the invention, in a state where the extension/contraction portion is bent and contracted in the same manner as a pantograph, its bending angle (the angle formed between the first leg portion and the second leg portion) can be made smaller than in the conventional art, and thus it is possible to shorten the length in the extending/contracting direction. In addition, according to this configuration, when a force is applied to the clip in the insertion direction in the mounted state where the extension/contraction portion is bent and contracted in the same manner as a pantograph, the force is transmitted to the first leg portion via the first hinge portion, is mainly absorbed by elastic deformation of the first leg portion, and is less likely to be transmitted to the second leg portion via the second hinge portion. Thus, a force that presses the second leg portion or the connection leg portion in the insertion direction is less likely to be generated. As a result, a force that separates the engagement portion from the insertion base portion is less likely to be generated with respect to the connection leg portion, and thus the engagement state is not easily released.

In addition, in the mounted state where the extension/contraction portion is bent and contracted in the same manner as a pantograph, the stopper contact portion of the first leg portion presses up the silencer with the second hinge portion as a fulcrum, and thus the silencer is pressed between the stopper contact portion at the back surface side thereof and the contact portion at the front surface side thereof and hence is stably held. In addition, when a force is applied to the clip in the insertion direction in the mounted state where the extension/contraction portion is bent and contracted in the same manner as a pantograph, the force is mainly absorbed by elastic deformation of the stopper contact portion side of the first leg portion which presses up the silencer, and is less likely to be transmitted to the second leg portion via the second hinge portion.

The intermediate portion of the first leg portion mentioned here is a segment between the one end and the other end of the first leg portion, the second hinge portion being formed at the intermediate portion means that the second hinge portion is formed at any position within the segment, and, for example, the second hinge portion being provided at a position closer to the one end side or at a position closer to the other end side is also included. It should be noted that when the second hinge portion is provided at a position closer to the one end side at which the first hinge portion is formed and the length of the stopper contact portion from the second hinge portion to the other end is made long, greater elastic deformation of the stopper contact portion is enabled. Thus, when a force is applied to the clip in the insertion direction in the mounted state where the extension/contraction portion is bent and contracted in the same manner as a pantograph, the stopper contact portion is able to absorb more of the force, and it is possible to further reduce a force transmitted to the second leg portion via the second hinge portion.

BRIEF DESCRIPTION OF THE DRAWINGS

FIG. 11A is a diagram illustrating mounting of the clip in FIG. 1 onto a silencer in the same cross section as the cross section C-C in FIG. 5;

FIG. 11B is a diagram illustrating mounting of the clip in FIG. 1 onto the silencer in the same cross section as the cross section C-C in FIG. 5;

FIG. 11C is a diagram illustrating mounting of the clip in FIG. 1 onto the silencer in the same cross section as the cross section C-C in FIG. 5;

FIG. 12 is a cross-sectional view showing a state where the clip in FIG. 8 is contracted and fixed to the silencer;

DESCRIPTION OF THE EMBODIMENTS

Figure 1:
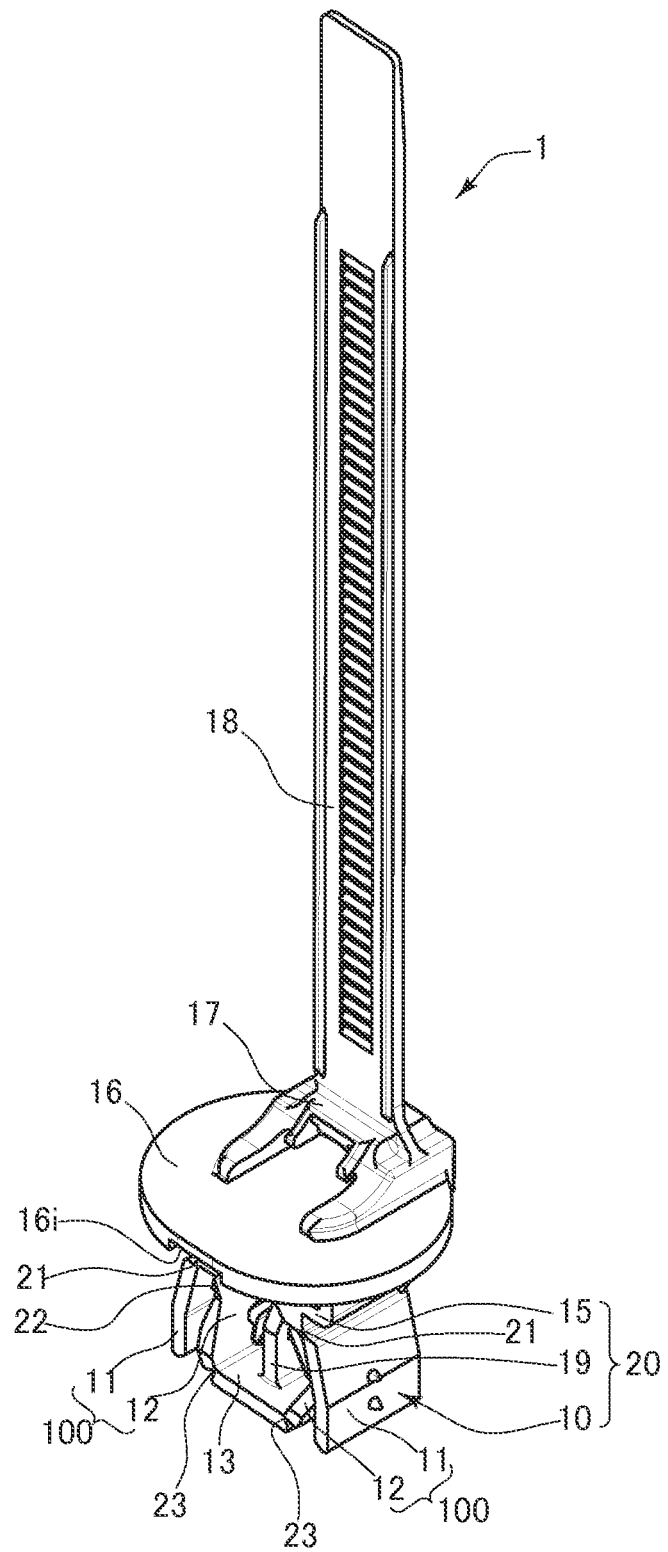
FIG. 1 is a perspective view showing an embodiment of a clip according to the invention.
Figure 2:
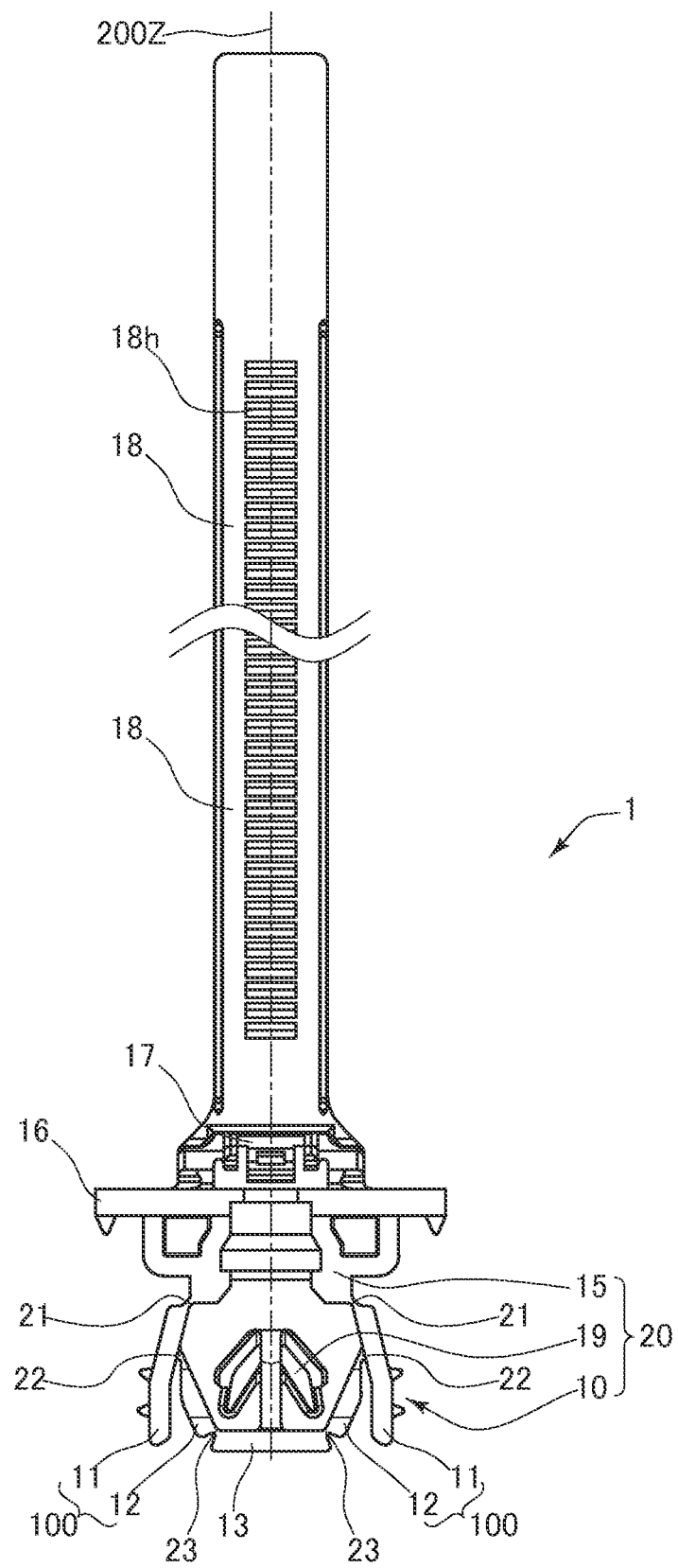
FIG. 2 is a front view of the clip in FIG. 1.
Figure 3:
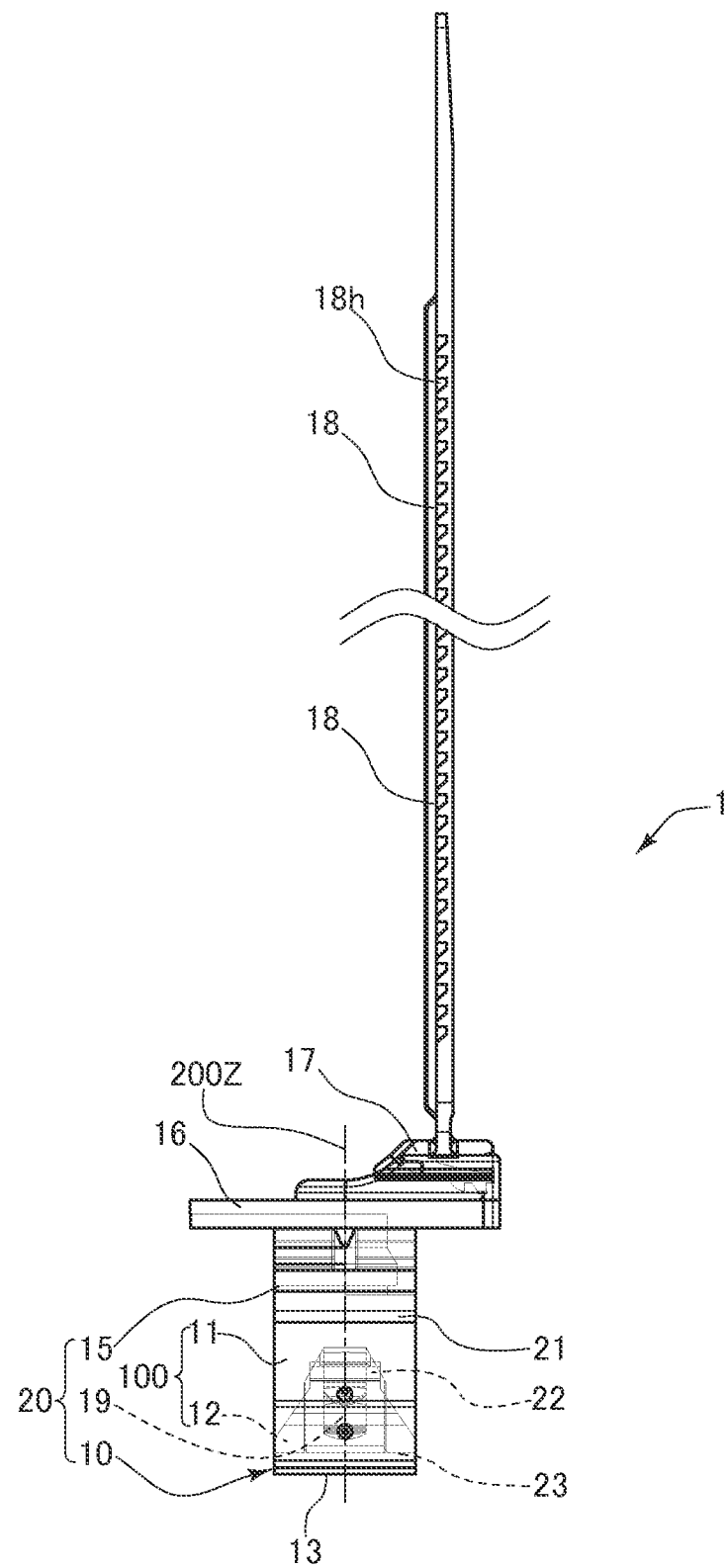
FIG. 3 is a side view of the clip in FIG. 1.

Hereinafter, an embodiment of the invention will be described with reference to an embodiment shown in the drawings.

Figure 6:
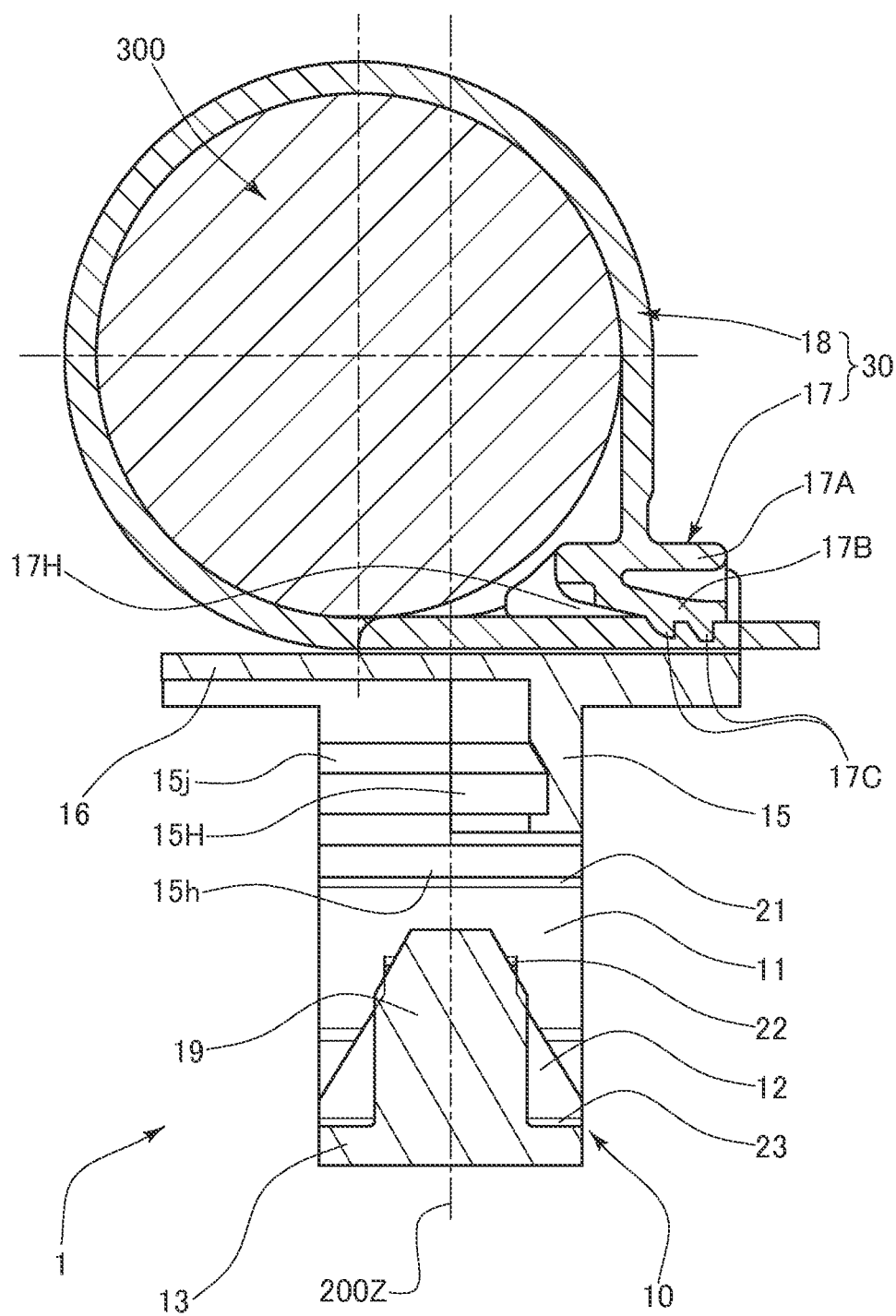
FIG. 6 is a cross-sectional view of the clip in FIG. 1, taken along the same cross section as a cross section A-A in FIG. 5, in a state where a mounted object is mounted on the clip.

As shown in FIGS. 11A to 11C, a silencer 200 for absorbing sound is disposed or fixed on a base member 2 such as an inner surface of an instrument panel or a floor of a vehicle. A clip 1 according to the invention is mounted on the silencer 200. It should be noted that the clip 1 is capable of holding a mounted object 300 as shown in FIG. 6, and thus it is possible to mount the mounted object 300 on the silencer 200 by mounting the clip 1 onto the silencer 200 in a state where the clip 1 holds the mounted object 300.

First, the silencer 200 will be described.

As shown in FIGS. 11A to 11C, the silencer 200 is formed from an elastically-deformable soft material such as felt or the like, and has a hole 200H opened at a side on which the clip 1 is mounted (hereinafter, referred to as a front surface 200a side). The hole 200H is opened also at a back surface 200c side. The hole 200H has a shape corresponding to the clip 1 and includes a reduced hole portion 201 which is opened at the front surface 200a side and has a hole shape with a width W1 and a depth D1; and an enlarged hole portion 202 which is opened at the back surface 200c side and has a hole shape with a width W2 and a depth D2 larger than those of the reduced hole portion 201. The reduced hole portion 201 and the enlarged hole portion 202 each have a quadrangular shape and are formed such that the center positions (not shown) thereof coincide with each other and the shapes thereof are similar to each other in a plan view. A portion where the reduced hole portion 201 and the enlarged hole portion 202 are connected to each other has a step surface 200b facing the back surface 200c side. Thus, the hole 200H (the reduced hole portion 201 and the enlarged hole portion 202) in a front view is bilaterally symmetrical. In addition, the base member 2 is located at the back surface 200c side of the silencer 200, and the opening of the enlarged hole portion 202 at the back surface 200c side is closed by the base member 2.

Next, the clip 1 according to the embodiment will be described.

The clip 1 according to the embodiment is an integrated structure molded by resin injection molding. As shown in FIGS. 1 to 8, the clip 1 includes a holding portion 30 which is capable of holding the mounted object 300 such as a wire harness or the like as shown in FIG. 6; an insertion portion 20 (see FIGS. 1 to 3) which is inserted into the hole 200H of the silencer 200; and a contact portion 16 which is brought into contact with a front surface 200x (see FIG. 11A) of a portion, surrounding the hole 200H, of the silencer 200, at a near side in an insertion direction Z1 (see FIG. 4: hereinafter, also referred to as a downward direction Z1). The clip 1 can be mounted on the silencer 200 such that the insertion portion 20 is inserted into the hole 200H of the silencer 200.

Figure 4:
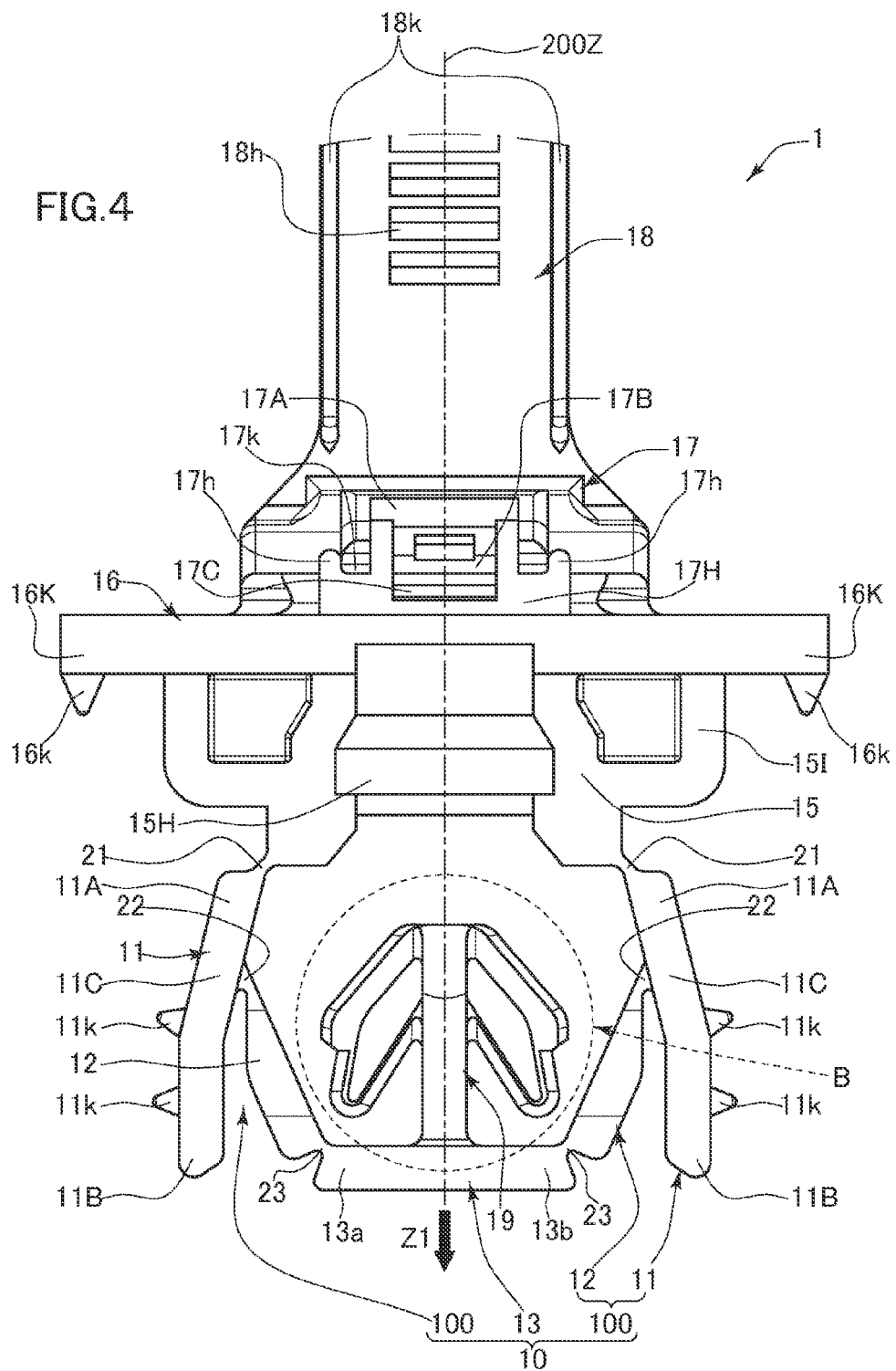
FIG. 4 is an enlarged view of a lower side of the clip in FIG. 1.

As shown in FIGS. 4 and 6, the holding portion 30 includes a band fixing portion 17 which is provided at the upper center portion of the contact portion 16; and a band 18 which extends upward from a band support portion 17A which is an upper portion of the band fixing portion 17. On a principal surface of the band 18, a plurality of engagement recesses 18h are formed intermittently along the longitudinal direction of the band 18. The band 18 can be inserted into an insertion hole 17H of the band fixing portion 17 from its leading end by being curved as shown in FIG. 6. Within the insertion hole 17H of the band fixing portion 17, an elastic piece 17B having engagement projections 17C projecting inward is provided. The band 18 inserted through the insertion hole 17H is further inserted in such a manner as to elastically deform and push aside the elastic piece 17B. Each time the engagement projections 17C reach above the engagement recesses 18h, the elastic piece 17B elastically returns. When the engagement recesses 18h have moved past the engagement projections 17C, the band 18 elastically deforms and pushes aside the elastic piece 17B again. As described above, the band 18 is curved into a ring such that the diameter thereof is gradually reduced while entry of the engagement projections 17C into the engagement recesses 18h is repeated. The mounted object 300 such as a wire harness or the like is held in such a manner as to be disposed within the ring of the band 18 and encircled by the band 18. It should be noted that as shown in FIG. 4, guide projections 18k are provided at both sides in the width direction of the band 18 so as to extend in the longitudinal direction of the band 18. When the band 18 is inserted through the insertion hole 17H of the band fixing portion 17, the insertion is guided such that the guide projections 18k pass through the inside of guide grooves 17h.

Figure 5:
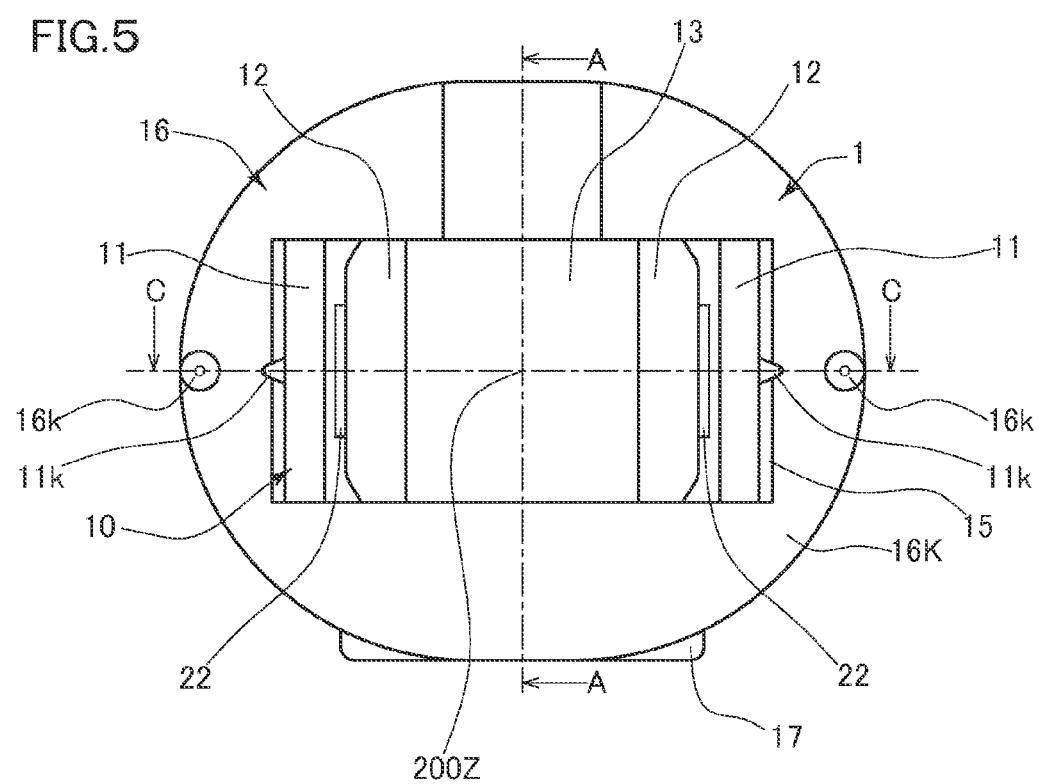
FIG. 5 is an enlarged view of a bottom surface of the clip in FIG. 1.

As shown in FIGS. 4 and 5, the contact portion 16 is formed at an upper portion of the insertion portion 20 (an insertion base portion 15) in a plate shape extending in a direction orthogonal to the insertion direction Z1, and includes an outer plate portion 16K extending outward of the insertion portion 20. Projections 16k are formed on a lower surface of the outer plate portion 16K so as to extend downward. In mounting the clip 1 onto the silencer 200, the silencer 200 is disposed such that an upper surface thereof is brought into contact with the lower surface of the outer plate portion 16K, and each projection 16k serves as a digging-in portion (here, a conical projection) digging into the silencer 200, thereby preventing displacement of the clip 1.

As shown in FIGS. 4, 9, 10, and 11A to 11C, the insertion portion 20 includes: the insertion base portion 15 which is located within the hole 200H of the silencer 200 in a state where the clip 1 is mounted on the silencer 200; an extension/contraction portion 10 which is provided at a lower portion of the insertion base portion 15 and projects within the hole 200H toward a far side in the insertion direction Z1 in the state where the clip 1 is mounted on the silencer 200, and is deformable so as to extend and contract (deformable so as to be shortened and deformable so as to be lengthened) in the insertion direction Z1 in the same manner as a pantograph by bending such that intermediate portions (second hinge portions 22) in the insertion direction Z1 are displaced outward; and an engagement portion 19 which gets close to and comes into engagement with the insertion base portion 15 when the extension/contraction portion 10 is contracted.

Figure 10:
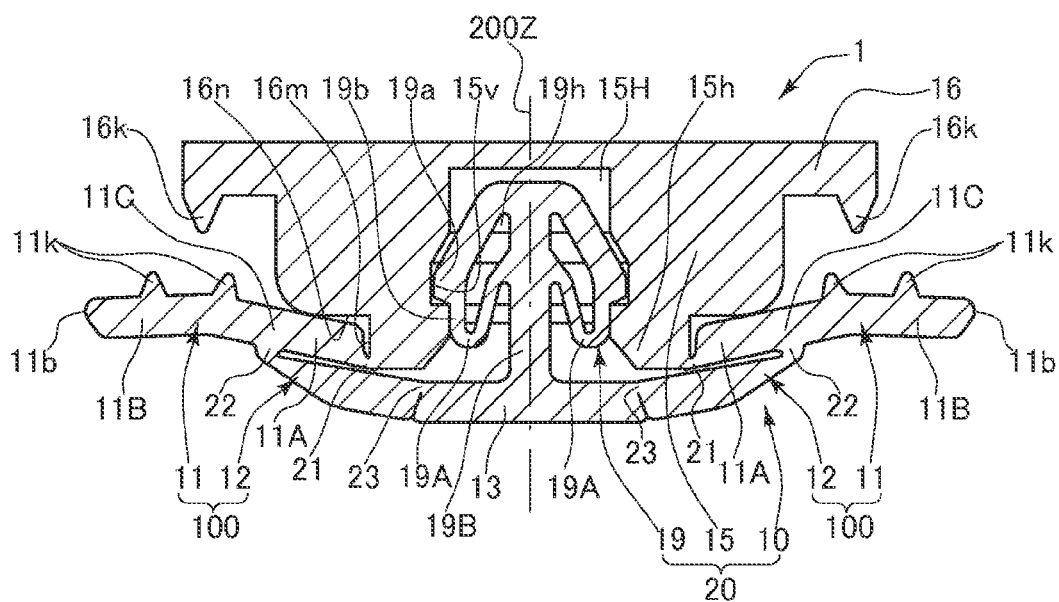
FIG. 10 is a cross-sectional view showing an engagement state where the clip in FIG. 9 is contracted.

As shown in FIG. 4, the insertion base portion 15 is formed at the lower center portion of the contact portion 16, and includes, at a lower end side thereof, an engagement receiving portion 15H which receives entry of the later-described engagement portion 19 from below and engages with the engagement portion 19. In addition, the insertion base portion 15 includes, at an outer side thereof, reinforcing portions (ribs) 15I which reinforce connection with the contact portion 16. Furthermore, a lower portion of the insertion base portion 15 has a thickness, in the direction orthogonal to the insertion direction Z1 (a width in the right-left direction in FIG. 4), which is smaller than that of an upper portion of the insertion base portion 15. As shown in FIG. 10, either one of or both an outer surface 16m of the lower portion and a lower surface 16n of the upper portion of the insertion base portion 15 serve as bending restriction portions (stoppers) which restrict bending by restricting bending of later-described first leg portions 11 of the extension/contraction portion 10 at first hinge portions 21 at a predetermined angle.

As shown in FIG. 4, the extension/contraction portion 10 includes opposed leg portions 100 which extend at both sides of an insertion axis 200Z for the hole 200H of the silencer 200 in the axial direction of the insertion axis 200Z (also referred to as an insertion direction) and are opposed to each other. As described above, these opposed leg portions 100 are formed as a pair opposed to each other. Each of the opposed leg portions 100 includes the first leg portion 11 which is bendably connected to the insertion base portion 15 via the first hinge portion 21; and a second leg portion 12 which is connected to the first leg portion 11 via the second hinge portion 22. Furthermore, the extension/contraction portion 10 includes a connection leg portion 13 which is bendably connected to one of the second leg portions 12 of the opposed leg portions 100 via a third hinge portion 23 at one end 13a side thereof and is bendably connected to the other of the second leg portions 12 via a third hinge portion 23 at the other end 13b side thereof.

It should be noted that the clip 1 according to the embodiment is integrally molded as a resin injection molded article, and the respective hinge portions 21 to 23 are formed so as to be thinner than the insertion base portion 15 and the respective leg portions 11 to 13 connected thereto, and thus is bendable.

In the extension/contraction portion 10, after the insertion portion 20 is inserted into the hole 200H as shown in FIG. 11B, the connection leg portion 13 is pressed in a direction opposite to the insertion direction Z1 to be displaced in a direction approaching the insertion base portion 15 (see FIG. 11C). Due to this replacement, each opposed leg portion 100 is bent so as to displace the second hinge portion 22 in a direction away from the insertion axis 200Z (outward), and thus is contracted in the direction opposite to the insertion direction Z1. Specifically, in each of the opposed leg portions 100, the first leg portion 11 rotates about the first hinge portion 21 at one end 11a side thereof to displace a second end portion (extension portion) 11B at the other end 11b side thereof in an upward and outward direction, and the second leg portion 12 rotates about the second hinge portion 22 at an intermediate position on the first leg portion 11 while being displaced with the first leg portion 11, to displace an end portion thereof at the third hinge portion 23 side in an upward and inward direction. With these displacements, the connection leg portion 13 is also displaced upward so as to rotate about the third hinge portions 23 at both ends thereof, and gets close to the insertion base portion 15. As a result, a folded state is obtained with such a small angle that each first leg portion 11 and each second leg portion 12 are in contact with or close to each other. Due to the upward displacement of the connection leg portion 13, a mounted state (an engagement state: FIGS. 10 and 12) is obtained in which the engagement portion 19 formed at the connection leg portion 13 has got close to and has come into engagement with the insertion base portion 15.

The insertion base portion 15 includes the engagement receiving portion 15H which is opposed to the connection leg portion 13 in the insertion direction Z1 and receives entry of the engagement portion 19, which is formed at the connection leg portion 13, in the direction opposite to the insertion direction Z1 (i.e., in an upward direction Z2). The engagement receiving portion 15H is an engagement hole which is opened in the insertion direction Z1 and has a depth direction that is the direction opposite to the insertion direction Z1. When the engagement portion 19 enters into a predetermined position within the engagement hole 15H, the engagement portion 19 comes into engagement with the engagement hole 15H to come into a state of being held within the engagement hole 15H. The engagement hole 15H according to the embodiment has an engagement groove 15v which is recessed on an inner peripheral surface thereof in the direction away from the insertion axis 200Z (outward). Meanwhile, the engagement portion 19 includes engagement projections 19A which project in the direction away from the insertion axis 200Z. When the engagement projections 19A of the engagement portion 19 enter the engagement groove 15v within the engagement hole 15H, the above-described mounted state (the engagement state: FIGS. 10 and 12) is obtained.

Figure 7:
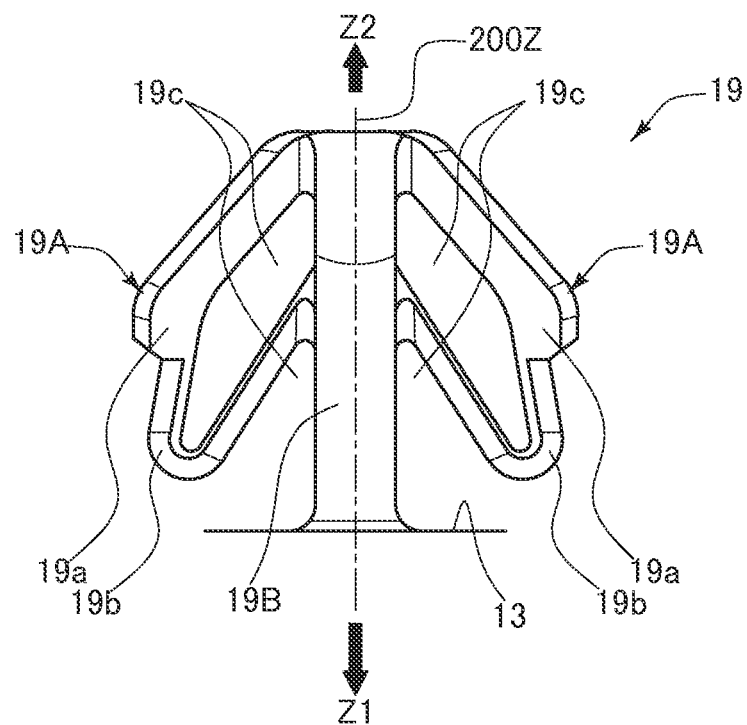
FIG. 7 is an enlarged view of a portion B in FIG. 4.
Figure 8:
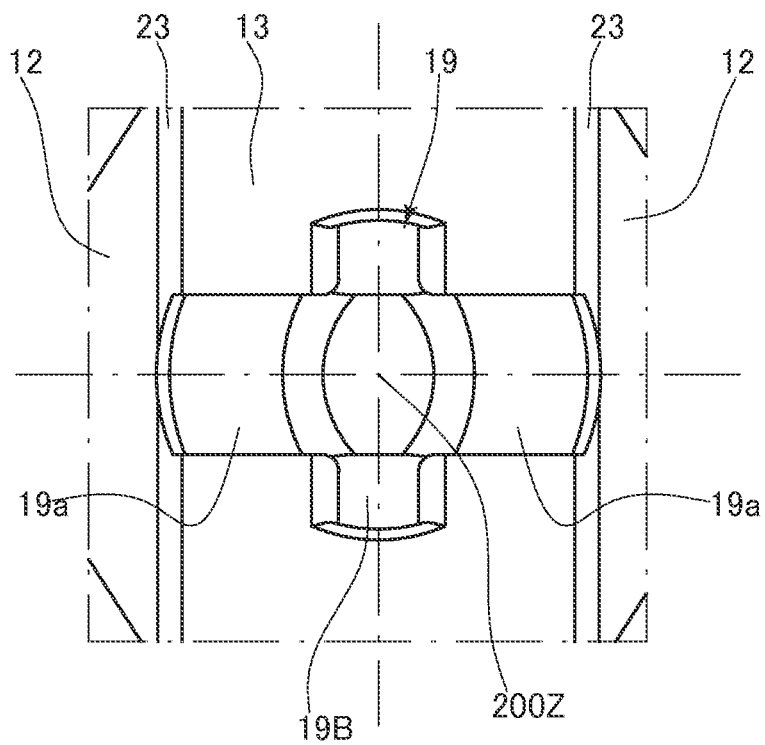
FIG. 8 is a plan view of the portion B in FIG. 4 as seen from above.

As shown in FIG. 7, the engagement portion 19 according to the embodiment includes a shaft portion 19B which extends linearly from a center portion of the connection leg portion 13 in the direction opposite to the insertion direction Z1 (in the upward direction Z2); and the engagement projections 19A which project outward from the shaft portion 19B. Each engagement projection 19A includes: an engagement claw portion 19a which enters and comes into engagement with the engagement groove 15v; and an engagement contact portion 19b which is brought into contact with an inner peripheral surface of an insertion opening 15h located at the far side, in the insertion direction Z1 (the lower side), of the engagement groove 15v in the engagement hole 15H, in this engagement state. Furthermore, an opening 19c is formed between the engagement claw portion 19a and the engagement contact portion 19b; and the shaft portion 19B, so that the engagement claw portion 19a and the engagement contact portion 19b easily elastically deform so as to get close to the shaft portion 19B. In other words, when the engagement portion 19 according to the embodiment enters the engagement hole 15H, each engagement claw portion 19a is caused to move over the inner peripheral surface of the insertion opening 15h while elastically deforming so as to get close to the shaft portion 19B and then enters the engagement groove 15v, so that the engagement portion 19 is held in an outwardly pressing state due to an elastic restoring force of each engagement claw portion 19a.

Meanwhile, each second hinge portion 22 or a peripheral portion thereof serves as a stopper contact portion which moves around to and comes into contact with the step surface (the surface reverse to the front surface 200x of the portion surrounding the hole 200H) 200b of the silencer 200 when the mounted state (the engagement state: FIGS. 10 and 12) is obtained by the above-described bending that displaces the second hinge portion 22 outward. Due to this contact, a coming-off prevented state is obtained in which the entire clip 1 is prevented from coming off in the direction opposite to the insertion direction Z1 (in the upward direction Z2). In the embodiment, each second hinge portion 22 is provided at an intermediate portion 11C of the first leg portion 11 in a direction in which the first leg portion 11 extends, and each first hinge portion 21 is provided at a first end portion 11A side which is one end side in the direction in which the first leg portion 11 extends. Each second end portion 11B at the other end side of the first leg portion 11 serves as the above-described stopper contact portion.

In addition, each third hinge portion 23 is provided so as to be closer to the insertion axis 200Z than the first hinge portion 21. Thus, in the mounted state (FIG. 12), a folded state is obtained with such a small angle that each first leg portion 11 and each second leg portion 12 are in contact with or close to each other. In the embodiment, a bending angle between the first leg portion 11 (the first end portion 11A) and the second leg portion 12 in the folded state of FIG. 10 in which the silencer 200 is not sandwiched is not smaller than 0 degree and not greater than 5 degrees. Here, the "bending angle" means an angle formed between the first leg portion 11 and the second leg portion 12, and "0 degree" means that the first leg portion 11 and the second leg portion 12 are parallel to each other. When a force is applied to the clip 1 in the downward direction Z1 in the folded state of the first leg portion 11 and the second leg portion 12, the force is dispersed also in a direction in which each second hinge portion 22 is pressed down, is transmitted to each first leg portion 11 via each second hinge portion 22, and is consumed for elastic deformation of each first leg portion 11. Thus, a force transmitted to each second leg portion 12 is reduced, and the connection leg portion 13 is less likely to be pressed down in the downward direction Z1. In other words, the engagement of the engagement portion 19 with the insertion base portion 15 is less likely to be released. It should be noted that the bending angle between the first leg portion 11 (the first end portion 11A) and the second leg portion 12 satisfies being not smaller than 0 degree and not greater than 5 degrees also in the folded state of FIG. 12 in which the silencer 200 is sandwiched.

More specifically, in the above-described mounted state (the engagement state: FIG. 12), when a force is applied to the clip 1 in the downward direction Z1, each one end 11a side is pressed down and each second end portion 11B (stopper contact portion) at the other end 11b side is pressed up with the second hinge portion 22 as a fulcrum. At that time, each second end portion 11B is pressed against the silencer 200 (pressed up). Due to this pressing, elastic deformation occurs. Thus, this deformation absorbs a part of the force, and a force transmitted from each second hinge portion 22 to each second leg portion 12 is reduced. As a result, a force transmitted from each second leg portion 12 to the connection leg portion 13 is reduced, thus the connection leg portion 13 is less likely to be pressed down in the downward direction Z1, and the engagement of the engagement portion 19 with the insertion base portion 15 is less likely to be released.

Figure 9:
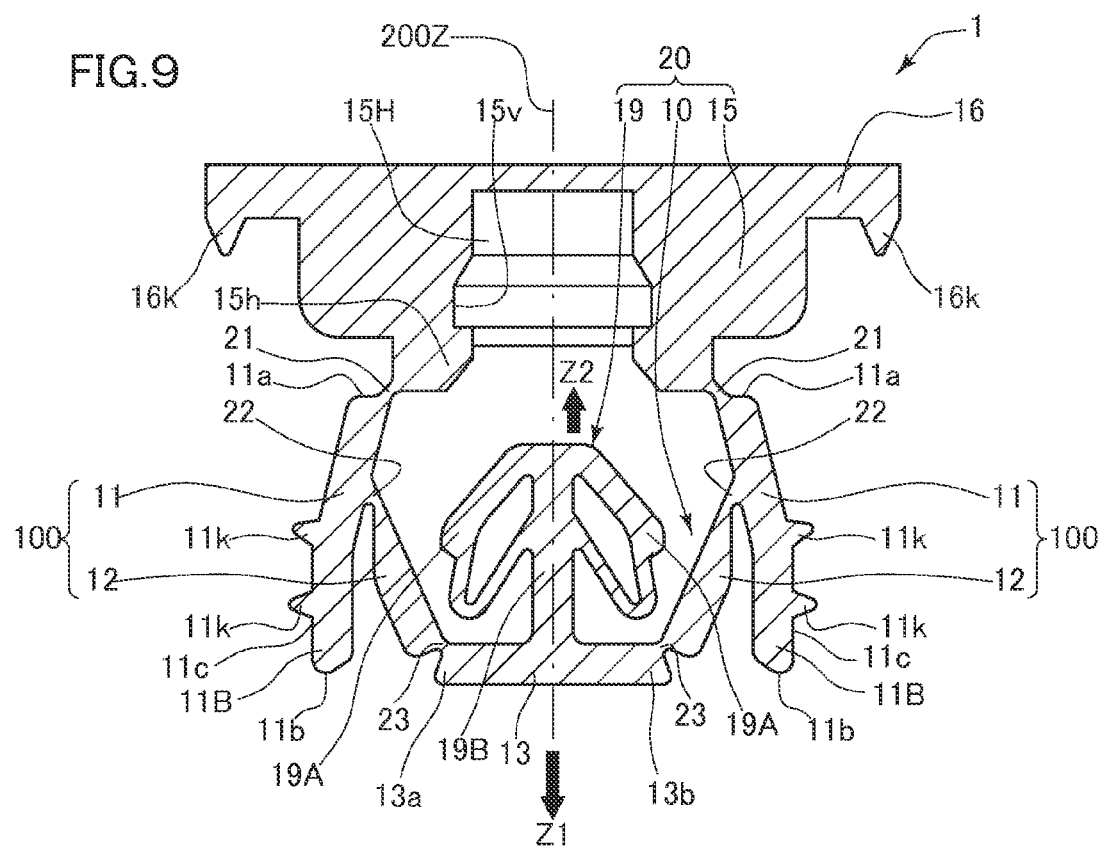
FIG. 9 is a C-C cross-sectional view of FIG. 5.

In addition, the intermediate portion 11C of each first leg portion 11 is a segment between one end 11a and the other end 11b of the first leg portion 11, and each second hinge portion 22 may be formed at any position within the intermediate portion 11C. However, each first leg portion 11 according to the embodiment is formed such that, as shown in FIG. 9, the length from the second hinge portion 22 to the other end 11b is longer than the length from the second hinge portion 22 to the one end 11a at which the first hinge portion 21 is formed. In other words, when the second end portion 11B (stopper contact portion), which is a portion of the first leg portion 11 from the second hinge portion 22 to the other end 11b, is formed so as to have a long length, greater elastic deformation of the second end portion 11B is enabled, so that a greater force is absorbed. Thus, it is possible to reduce a force transmitted from the second hinge portion 22 to the second leg portion 12, by the absorbed force, and a configuration is provided in which the connection leg portion 13 is further less likely to be pressed down in the downward direction Z1, that is, the engagement of the engagement portion 19 with the insertion base portion 15 is further less likely to be released.

It should be noted that in the embodiment, as shown in FIG. 4, each third hinge portion 23 is formed so as to be located inward of the first hinge portion 21, by making the length of the first leg portion 11 from the first hinge portion 21 to the second hinge portion 22 shorter than the length of the second leg portion 12 from the second hinge portion 22 to the third hinge portion 23. Specifically, each first hinge portion 21 extends in an oblique direction from the inner side of the upper end of the first leg portion 11 to a corner portion of the lower end of the insertion base portion 15. Each second hinge portion 22 extends from a center in a width direction (the depth direction in FIG. 4, the up-down direction in FIG. 5) of an inner surface that is the inner side of the first leg portion 11 to the upper end of the second leg portion 12. It should be noted that each second leg portion 12 is formed as a plate having a trapezoidal shape whose width is increased toward the lower side (see FIG. 6). Each third hinge portion 23 extends from the inner side of the lower end of the second leg portion 12 to the upper side of an outer end (13a, 13b) of the connection leg portion 13.

Here, a mounting method for mounting the clip 1 according to the embodiment onto the silencer 200 will be described with reference to FIGS. 11A to 11C.

In the extension/contraction portion 10 according to the embodiment, the second end portion 11B (and its outer surface 11c) at the side opposite to the first hinge portion 21 in each of the first leg portions 11 of the paired opposed leg portions 100 is tilted so as to be spaced apart from the insertion axis 200Z such that a distance therebetween is increased toward the far side in the insertion direction Z1 (the lower side in the drawing) as shown in FIG. 9 or is parallel to the insertion axis 200Z. By causing the second end portions 11B to get close to the insertion axis 200Z (e.g., by pinching the opposed second end portions 11B), the extension/contraction portion 10 comes into an insertion form in which the width thereof in a direction in which the paired opposed leg portions 100 are opposed to each other is narrowed (FIG. 11A). When the extension/contraction portion 10 is in the insertion form, the extension/contraction portion 10 is allowed to pass through the hole 200H of the silencer 200, through which the insertion base portion 15 can pass, from the connection leg portion 13 side.

When the extension/contraction portion 10 according to the embodiment is in the insertion form, the outer surface 11c of each second end portion 11B is formed as an inclined surface that is closer to the insertion axis 200Z toward the far side in the insertion direction Z1. In other words, when the extension/contraction portion 10 is in the insertion form, the lower side of the clip 1 has a tapered shape due to the inclined surfaces. Thus, the outer surface 11c of each second end portion 11B serves as a guide surface when the clip 1 is inserted into the hole 200H of the silencer 200.

It should be noted that only the outer surface 11c at a leading end side of each second end portion 11B may serve as a guide surface, that is, an inclined surface may be formed only at the leading end side of each second end portion 11B so as to have a tapered shape.

The clip 1 that is in the insertion form as shown in FIG. 11A is inserted into the hole 200H of the silencer 200 such that the connection leg portion 13 is initially inserted as shown in FIG. 11B. Thus, the insertion base portion 15 is fitted and accommodated in the reduced hole portion 201, and the extension/contraction portion 10 is accommodated in the enlarged hole portion 202. After this insertion, the extension/contraction portion 10 is released from the above-described insertion form, and the clip 1 elastically returns to the original state (see FIG. 9). It should be noted that in the embodiment, the first end portion 11A (and its outer surface 11d) at the first hinge portion 21 side is tilted so as to be spaced apart from the insertion axis 200Z such that a distance therebetween is increased toward the far side in the insertion direction Z1, so that the clip 1 is easily pulled out of the hole 200H of the silencer 200 again.

In the clip 1 that is inserted into the hole 200H of the silencer 200, the connection leg portion 13 of the extension/contraction portion 10 is pressed up in the direction opposite to the insertion direction Z1 (in the upward direction Z2). Thus, the engagement portion 19 enters the engagement hole 15H of the insertion base portion 15, and the mounted state (see FIG. 11C) is obtained as already described.

It should be noted that a method for causing the engagement portion 19 to enter the engagement hole 15H of the insertion base portion 15 includes not only a method in which the connection leg portion 13 is directly pressed up by a finger in the direction opposite to the insertion direction Z1 but also a method in which the clip 1 is pressed in the insertion direction Z1 to a position where the connection leg portion 13 comes into contact with the base member 2, and then is further pressed in the insertion direction Z1 to be pressed against the base member 2 while the silencer 200 is elastically compressively deformed in the direction of the insertion axis 200Z, thereby relatively pressing up the connection leg portion 13 in the direction opposite to the insertion direction Z1. In the case of the latter, it is possible to mount the clip 1 onto the silencer 200 by merely performing an operation from the front surface 200a side of the silencer 200.

In the clip 1 that is in the above-described mounted state (engagement state), mainly the second end portion 11B of each first leg portion 11 moves around so as to be opposed to the step surface 200b of the silencer 200 and comes into contact with the step surface 200b to serve as a stopper contact portion. In the embodiment, outward projections 11k are formed on the outer surface 11c of the second end portion 11B of each first leg portion 11. In the above-described mounted state, the outer surface 11c of each second end portion 11B is brought into contact with the step surface 200b of the silencer 200, and each projection 11k serves as a digging-in portion (here, a conical projection) digging into the silencer 200, thereby preventing displacement of the clip 1.

In the clip 1 that is in the above-described mounted state (engagement state), as shown in FIG. 12, a state is obtained in which the silencer 200 is pressingly held in such a manner as to be pressed against the contact portion 16 due to the elasticity of the extension/contraction portion 10.

Specifically, a state is obtained in which the silencer 200 is pressed against the contact portion 16 by the second end portion 11B of each first leg portion 11. Thus, the clip 1 is assuredly mounted on the silencer 200. Furthermore, the silencer 200 is held while its displacement is prevented by digging of the projections 16k and 11k thereinto from both above and below.

In other words, as shown in FIG. 10, when the engagement portion 19 is caused to engage within the engagement hole 15H of the insertion base portion 15 without sandwiching the silencer 200, each of the second leg portions 12 at both sides of the connection leg portion 13 is tilted such that the second hinge portion 22 thereof connected to the first leg portion 11 is located above the connection leg portion 13. Each first leg portion 11 is also tilted such that the second end portion 11B opposite to the first end portion 11A is located above the first end portion 11A. However, in the above-described mounted state in which the silencer 200 is sandwiched, as shown in FIG. 12, the second end portion 11B of each first leg portion 11 is pressed down with the second hinge portion 22 as a fulcrum in a manner as to be pressed back by the elastic force of the silencer 200, and hence elastic deformation occurs. Thus, a force that presses the silencer 200 in the upward direction Z2 is generated in the second end portion 11B of each first leg portion 11, so that the silencer 200 is pressingly held.

In addition, when the engagement portion 19 is caused to engage within the engagement hole 15H of the insertion base portion 15 without sandwiching the silencer 200, the second leg portions 12 and the connection leg portion 13 are shaped so as to be linearly arranged in a direction orthogonal to the insertion axis 200Z. Each third hinge portion 23 connects the end portions of both the second leg portion 12 and the connection leg portion 13 to each other at their upper side, and when the second leg portion 12 and the connection leg portion 13 are linearly arranged, a state is obtained in which the lower sides of end portions of both portions are close to or in contact with each other. However, when a force is applied to each second hinge portion 22 in the downward direction Z1 such as in the mounted state in which the silencer 200 is sandwiched or when a force is applied to the clip 1 itself in the downward direction Z1, the end portions of both the second leg portion 12 and the connection leg portion 13 which are connected to each other via the third hinge portion 23 come into a pressed state where the lower sides of the end portions thereof at which the third hinge portion 23 is not formed are brought into surface contact with each other to increase the adhesion therebetween. As a result, a curved state is obtained in which the second leg portions 12 located at both outer sides of the connection leg portion 13 are pressed downward and the connection leg portion 13 is pressed upward relative to the second leg portions 12. Thus, a part of the force in the downward direction Z1 is absorbed, and a force that displaces the center of the connection leg portion 13 downward is greatly reduced. Therefore, the engagement of the engagement portion 19 with the insertion base portion 15 is less likely to be released.

In a state before the above-described mounting, as shown in FIG. 11A, in the clip 1 according to the embodiment, the length in the insertion axis direction (height) H2 of the extension/contraction portion 10 (from the first hinge portion 21 to the connection leg portion 13) is longer than the length in the insertion axis direction (height) H1 of the insertion base portion 15. As a result of shifting to the mounted state, the length in the insertion axis direction (height) H2 of the extension/contraction portion 10 (from the first hinge portion 21 to the connection leg portion 13) becomes H2' that is shorter than the length in the insertion axis direction (height) H1 of the insertion base portion 15.

Figure 13A:
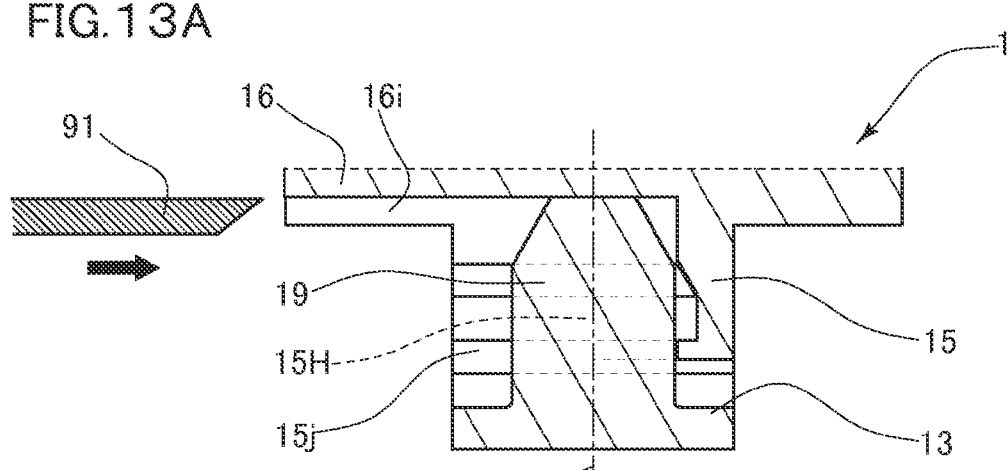
FIG. 13A is a diagram illustrating a method for releasing an engagement state where the clip in FIG. 1 is contracted, in the same cross section as the cross section A-A in FIG. 5.
Figure 13B:
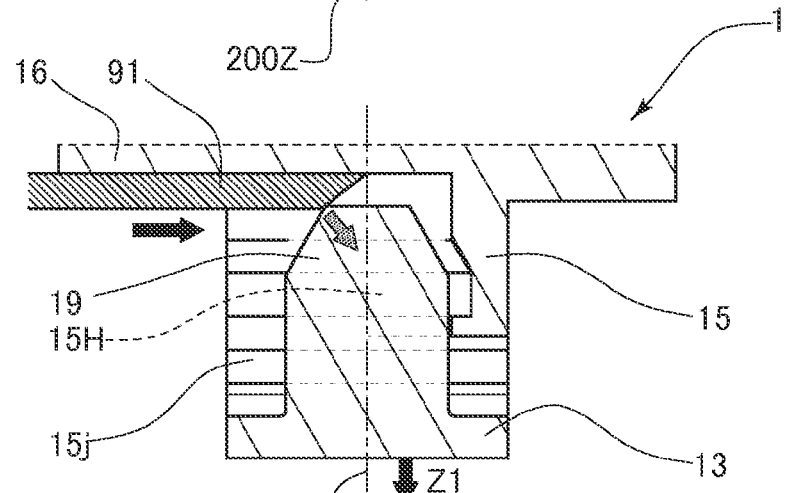
FIG. 13B is a diagram illustrating the method for releasing the engagement state where the clip in FIG. 1 is contracted, in the same cross section as the cross section A-A in FIG. 5.
Figure 13C:
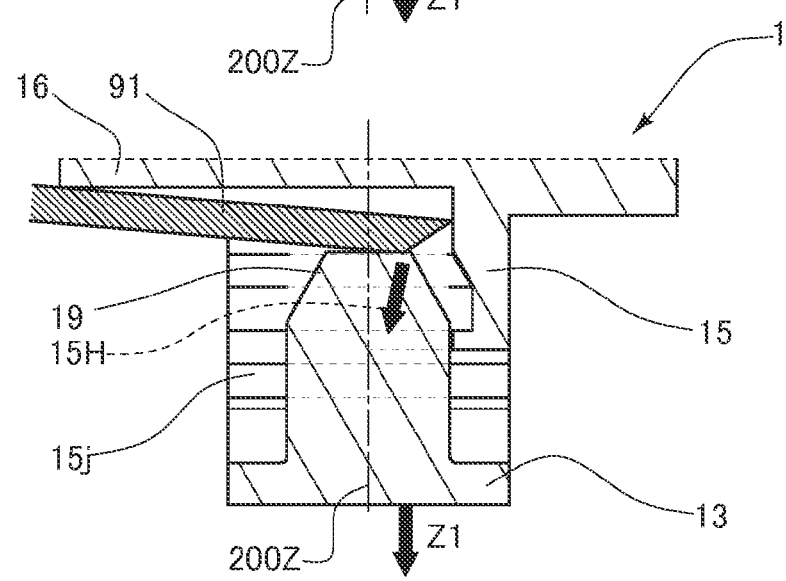
FIG. 13C is a diagram illustrating the method for releasing the engagement state where the clip in FIG. 1 is contracted, in the same cross section as the cross section A-A in FIG. 5.

Finally, a method for releasing the engagement state where the engagement portion 19 is caused to engage within the engagement hole 15H of the insertion base portion 15 will be described with reference to FIGS. 13A to 13C.

In the case where the clip 1 held by the silencer 200 is removed, first, the mounted object 300 such as a wire harness or the like which is held by the holding portion 30 of the clip 1 is removed. Since the engagement hole 15H of the insertion base portion 15 is opened at the front side, a tool (or a jig) 91 such as a slotted screwdriver or the like is inserted through a front-side opening 15j of the engagement hole 15H along the back surface (lower surface) of the contact portion 16, and a force is applied to the inserted tool 91 such that the tool 91 presses (presses down) the upper end of the engagement portion 19 in the downward direction Z1. At that time, the tool 91 comes into contact with a front-side portion of the contact portion 16 (a front-side end of the back surface of the contact portion 16, etc.), and it is possible to press (press down) the engagement portion 19 in the downward direction Z1 by using the principle of leverage. Thus, the engagement portion 19 is separated from the engagement hole 15H in the downward direction Z1, thereby obtaining an engagement released state (see FIG. 9). It should be noted that in the embodiment, a groove 16i (see FIG. 1) that guides insertion of the tool 91 is formed on the back surface of the contact portion 16.

Since the above-described mounted state (engagement state) is releasable as described above, it is possible to reuse the clip 1.

Although the embodiment of the invention has been described above, the embodiment is merely illustrative, the invention is not limited to the embodiment, and various modifications such as additions and omissions may be made based on the knowledge of a person skilled in the art without departing from the scope of the claims. Hereinafter, modifications of the above-described embodiment will be described. It should be noted that portions having the same functions as those in the above-described embodiment are designated by the same reference characters and the detailed description thereof is omitted. In addition, the above-described embodiment and the following modifications may be combined to be implemented as appropriate as long as no technical contradiction arises.

The clip 1 according to the above-described embodiment is an integrated molded article obtained by resin injection molding so as to include the holding portion 30 (17, 18). However, the holding portion 30 may be provided as a separate member, and then may be fixed. For example, the holding portion 30 may be provided as fixing means such as a tape or the like, and one or a plurality of wire harnesses may be held as mounted objects 300 by the fixing means.

Figure 14:
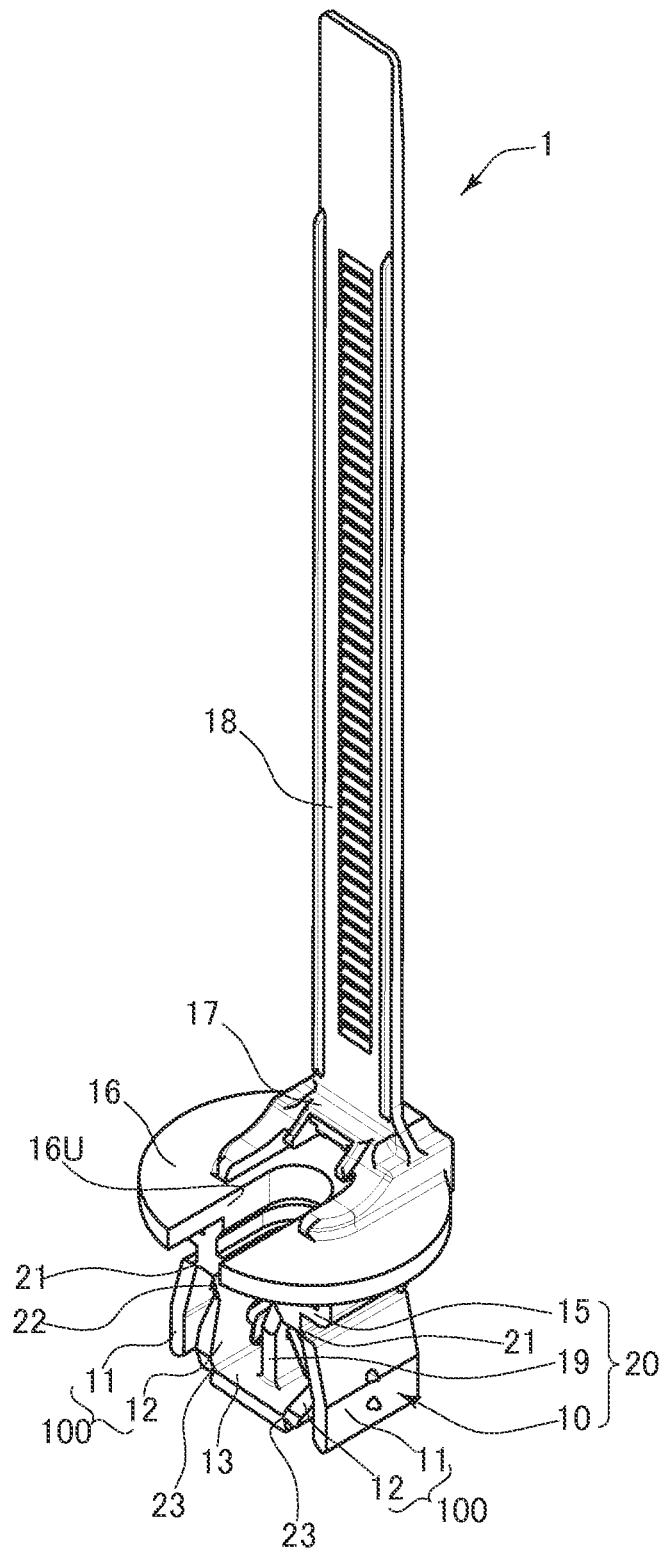
FIG. 14 is a perspective view showing a modification of the clip in FIG. 1.
Figure 15A:
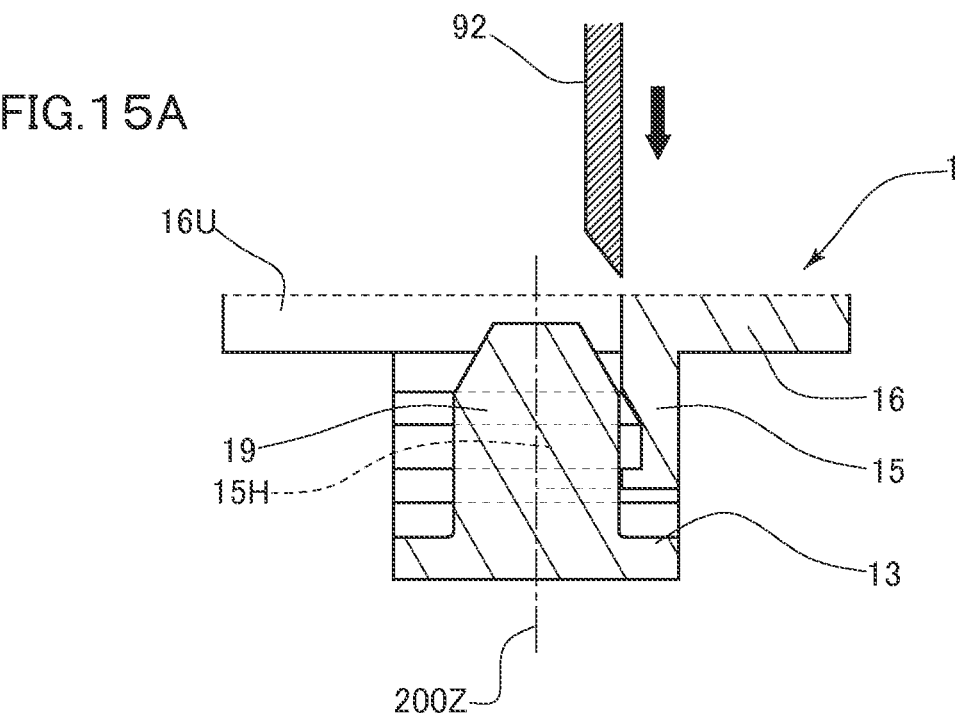
FIG. 15A is a diagram illustrating a method for releasing an engagement state where the clip in FIG. 14 is contracted, in the same cross section as the cross section A-A in FIG. 5.
Figure 15B:
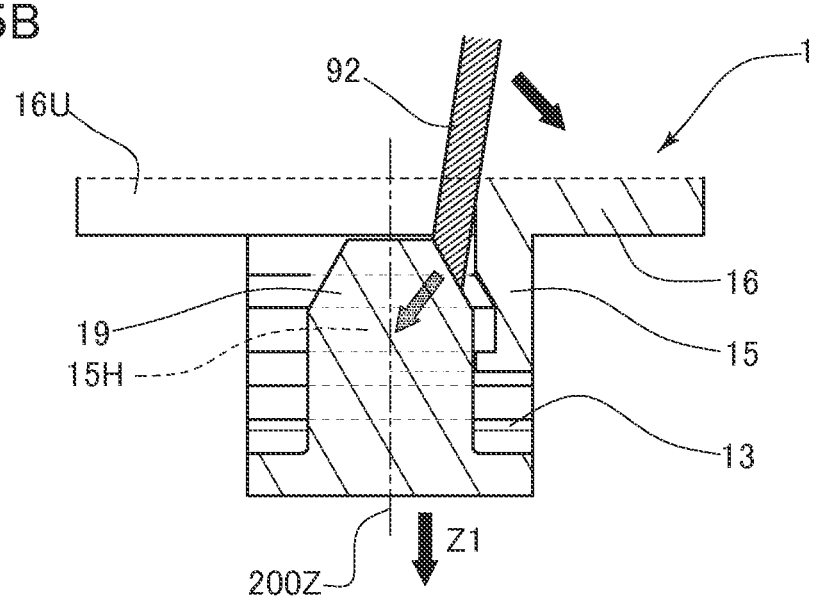
FIG. 15B is a diagram illustrating the method for releasing the engagement state where the clip in FIG. 14 is contracted, in the same cross section as the cross section A-A in FIG. 5.

Regarding the method for releasing the engagement state where the engagement portion 19 is caused to engage within the engagement hole 15H of the insertion base portion 15, another method may be used. For example, as shown in FIGS. 14, 15A, and 15B, an opening 16U is formed so as to extend from the center to the front of the contact portion 16 and communicate with the engagement hole 15H of the insertion base portion 15, a tool (or a jig) 92 such as a slotted screwdriver or the like is inserted through the opening 16U to the back side of the engagement portion 19, and a force is applied to the inserted tool 92 such that the tool 92 presses (presses down) the engagement portion 19 in the downward direction Z1 in such a manner as to push out the engagement portion 19 from its back toward its front. Thus, the engagement portion 19 is separated from the engagement hole 15H in the downward direction Z1, thereby obtaining an engagement released state (see FIG. 14).

What is claimed is:
1. A clip comprising:
a holding portion capable of holding a mounted object;
an insertion portion inserted into a hole of a silencer; and
a contact portion brought into contact with a front surface of a portion, surrounding the hole, of the silencer at a near side in an insertion direction in which the insertion portion is inserted, the clip being mounted on the silencer such that the insertion portion is inserted into the hole, wherein the insertion portion includes an insertion base portion which is located within the hole at the near side in the insertion direction in a state where the clip is mounted on the silencer; an extension/contraction portion which is located at a far side, in the insertion direction, of the hole in the state where the clip is mounted on the silencer and is deformable so as to extend and contract in the insertion direction in the same manner as a pantograph; and an engagement portion which gets close to and comes into engagement with the insertion base portion when the extension/contraction portion is contracted, the extension/contraction portion includes a pair of opposed leg portions which extend in the insertion direction at both sides of an insertion axis for the hole and are opposed to each other, and each of the opposed leg portions includes a first leg portion which is connected to the insertion base portion via a first hinge portion; and a second leg portion which is connected to the first leg portion via a second hinge portion, the extension/contraction portion further includes a connection leg portion which is connected to one of the second leg portions of the paired opposed leg portions via a third hinge portion at one end side thereof and is connected to the other second leg portion via a third hinge portion at another end side thereof, by displacing the connection leg portion in a direction opposite to the insertion direction, the opposed leg portions are contracted by bending such that the second hinge portions are displaced outward in a direction perpendicular to the insertion axis, to obtain a mounted state where the engagement portion formed at the connection leg portion has got close to and has come into engagement with the insertion base portion, each third hinge portion is formed at an inner side so as to be closer to the insertion axis than the first hinge portion, and a folded state where the first leg portion and the second leg portion are in contact with or close to each other is obtained in the mounted state, and in the first leg portion, the first hinge portion is formed at one end side in an extending direction in which the first leg portion extends, the second hinge portion is formed at an intermediate portion in the extending direction, and another end side in the extending direction is formed as a stopper contact portion which moves around to and comes into contact with a back surface of the silencer.

2. The clip according to claim 1, wherein a length of the first leg portion from the second hinge portion to the other end is longer than a length of the first leg portion from the second hinge portion to the one end at which the first hinge portion is formed.

\* \* \* \* \*